United States Patent
Sufka et al.

(10) Patent No.: US 7,120,994 B2
(45) Date of Patent: Oct. 17, 2006

(54) APPARATUS FOR THE AUTOMATED MANUFACTURE OF A PROBE TIP

(75) Inventors: Stephen James Sufka, Carson City, NV (US); Thane Fleming Tahti, Gardnerville, NV (US); David Ray Price, Gardnerville, NV (US); Steven Francis Roy, Gardnerville, NV (US); Kristoffer Wayne Wickstead, Carson City, NV (US)

(73) Assignee: General Electric Company, Schenectady, NY (US)

( * ) Notice: Subject to any disclaimer, the term of this patent is extended or adjusted under 35 U.S.C. 154(b) by 143 days.

(21) Appl. No.: 10/708,690

(22) Filed: Mar. 18, 2004

(65) Prior Publication Data

US 2005/0206369 A1  Sep. 22, 2005

(51) Int. Cl.
*B23P 19/00* (2006.01)

(52) U.S. Cl. .............................. 29/729; 29/595; 29/748; 324/207.15; 324/207.25

(58) Field of Classification Search ................. 29/595, 29/729, 748; 324/207.15, 207.26
See application file for complete search history.

(56) References Cited

U.S. PATENT DOCUMENTS

| | | | | |
|---|---|---|---|---|
| 5,685,884 | A | | 11/1997 | Van Den Berg .............. 29/595 |
| 5,712,562 | A | * | 1/1998 | Berg ..................... 324/207.16 |
| 5,818,224 | A | * | 10/1998 | Van Den Berg ....... 324/207.16 |
| 6,072,312 | A | * | 6/2000 | Van Den Berg ....... 324/207.16 |
| 6,131,270 | A | * | 10/2000 | Van Den Berg ........... 29/602.1 |
| 6,170,148 | B1 | | 1/2001 | Van Den Berg ........... 29/602.1 |
| 6,643,909 | B1 | | 11/2003 | Rose ........................... 29/595 |

\* cited by examiner

*Primary Examiner*—Carl J. Arbes
(74) *Attorney, Agent, or Firm*—Cantor Colburn LLP

(57) ABSTRACT

A method and apparatus for attaching a proximity probe offset to an axis defining an extension cable. The method and apparatus include a sensing element; a cylindrical part molded with a moldable material; a recess configured in one of two opposing ends defining the cylindrical part to receive the sensing element; a first and a second ferrule each extending from opposing surfaces defining an exterior of the cylindrical part, a first axis defining the first and second ferrules being offset from a second axis defining the cylindrical part; and an extension cable operably attached to the sensing element via the first and second ferrules, the sensing element being disposed offset relative to the extension cable.

13 Claims, 11 Drawing Sheets

APPARATUS FOR THE AUTOMATED MANUFACTURE OF A PROBE TIP

BACKGROUND OF THE INVENTION

The present invention relates to proximity probes, and, more particularly, to a method and apparatus for an eddy current probe for limited space applications that also allows for automated manufacture thereof.

Monitoring and diagnosing the status of rotating and reciprocating machinery start with accurate and dependable measurements from a transducer and its associated electronics and then proceed to other sophisticated analyzing apparatus for reduction and display. One such transducer is a proximity transducer which may be utilized for, inter alia, monitoring the vibration characteristics of a rotating shaft of a machine. In this environment, the transducer must operate under very adverse physical, chemical and mechanical conditions and it is often very difficult to replace such transducers. Thus, there is an ongoing effort to make the proximity transducer one of the most reliable parts of the monitoring system.

Typically, the proximity transducer, in conjunction with associated electronics, outputs a signal correlative to the spacing between an object or "target" (the rotating shaft of the machine) and a sensing coil of the proximity transducer. It is critical that the length or spacing between the target and the sensing coil of the proximity transducer remains within the linear range of the transducer for providing accurate and reliable measurements when in operation. Thus, one hallmark for providing accurate and reliable measurements relies on providing a transducer which is impervious to the predations of the environment and which does not consume an inordinate amount of the linear range of the transducer.

Standard eddy current probe designs are typically a forward mount design with a probe tip in-line with an extension cable. However, an in-line, forward mount tip does not allow the probe to be mounted in extremely tight locations such as in-between critical machine components and a target surface being measured.

Probes designed for limited space mounting applications are very specific to each application, and currently involve a number of labor intensive, manually operated processes to manufacture them. For example, a typical right angle or small, limited space mounting probe includes hand machined non-conductive components for the tip, a hand wound sensing coil, and a hand mixed, manually applied epoxy to encapsulate the tip for attachment to a stainless steel probe case. The probe case is used to operably mount the tip to the machine.

Thus, a limited mounting space probe that may be utilized in a wide variety of limited mounting space applications while reducing manual labor intensive operations for the manufacture thereof is desired.

BRIEF DESCRIPTION OF THE INVENTION

The above discussed and other drawbacks and deficiencies are overcome or alleviated in an exemplary embodiment by an apparatus for attaching a proximity probe offset to an axis defining an extension cable. The apparatus includes a sensing element; a cylindrical part molded with a moldable material; a recess configured in one of two opposing ends defining the cylindrical part to receive the sensing element; a first and a second ferrule each extending from opposing surfaces defining an exterior of the cylindrical part, a first axis defining the first and second ferrules being offset from a second axis defining the cylindrical part; and an extension cable operably attached to the sensing element via the first and second ferrules, the sensing element being disposed offset relative to the extension cable.

In an alternative embodiment, a method for attaching a proximity probe offset to an axis defining an extension cable is disclosed. The method includes disposing a first and a second ferrule in a molded cylindrical part, the first and second ferrules defining a first axis; disposing a sensing element in a recess configured in the molded cylindrical part, the first axis being offset from a second axis defining the cylindrical part; attaching leads from the sensing element to respective the first and second ferrules; and attaching an extension cable to respective first and second ferrules, thereby operatively connecting the sensing element with the extension cable.

In yet another alternative embodiment, a method for making a proximity probe offset to an axis defining an extension cable is disclosed. The method includes molding a cylindrical part with a moldable material; configuring a recess at one of two opposing ends defining the cylindrical part to receive a sensing element; and configuring the cylindrical part having a first and second cylinder containing a first and second ferrule extending from opposing cylindrical surfaces defining an exterior of the cylindrical part, a first axis defining the first and second cylinders being offset from a second axis defining the cylindrical part.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several Figures.

DETAILED DESCRIPTION OF THE INVENTION

Figure 1:
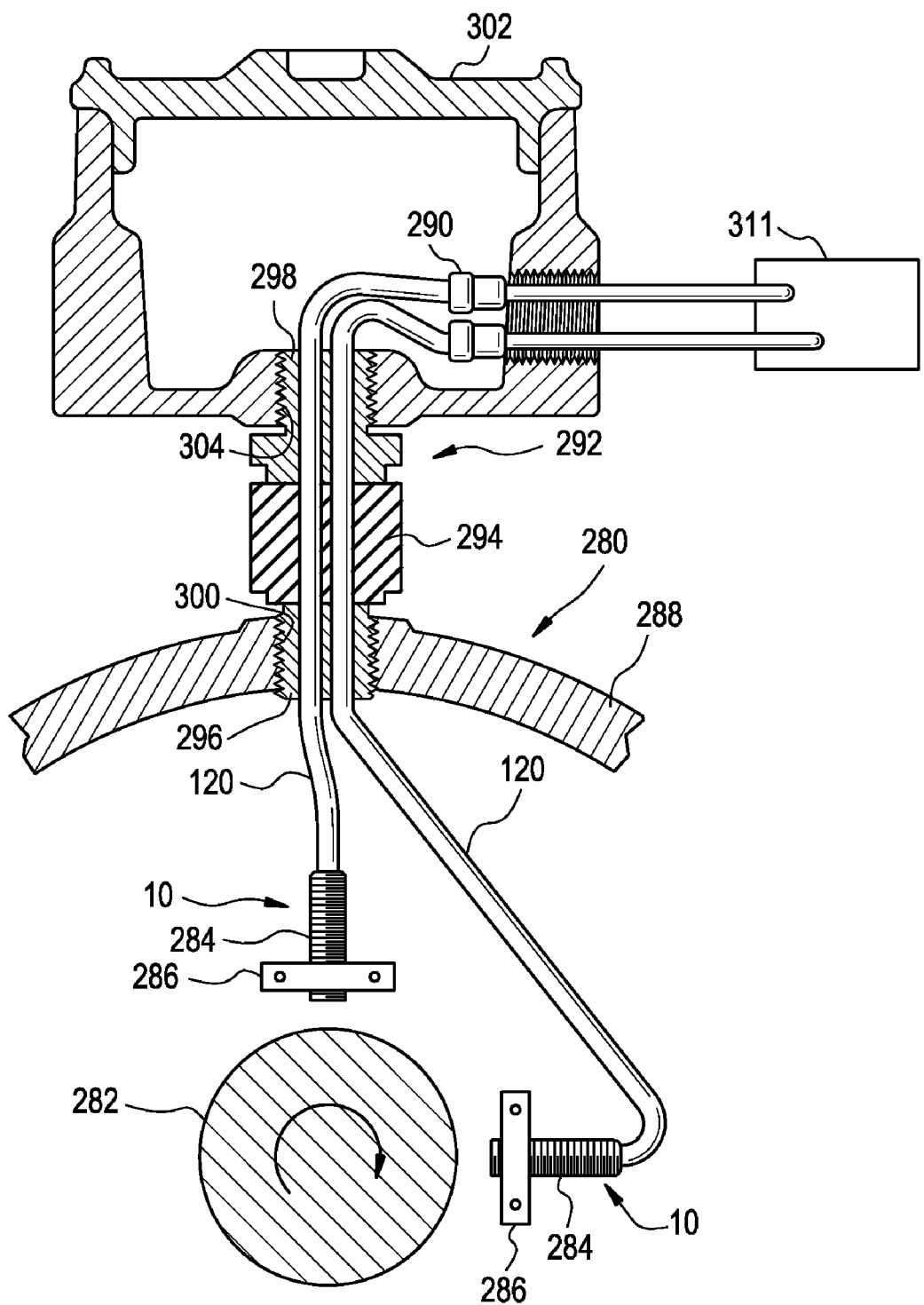
FIG. 1 is an elevational view of an encapsulated transducer with an offset component alignment perform juxtaposed to a rotating shaft of a machine for monitoring the vibration thereof in accordance with an exemplary embodiment.

Considering the drawings, wherein like reference numerals denote like parts throughout the various drawing figures, reference numeral 10 is directed to an encapsulated transducer with an offset component alignment perform according to an exemplary embodiment of the present invention.

Figure 2:
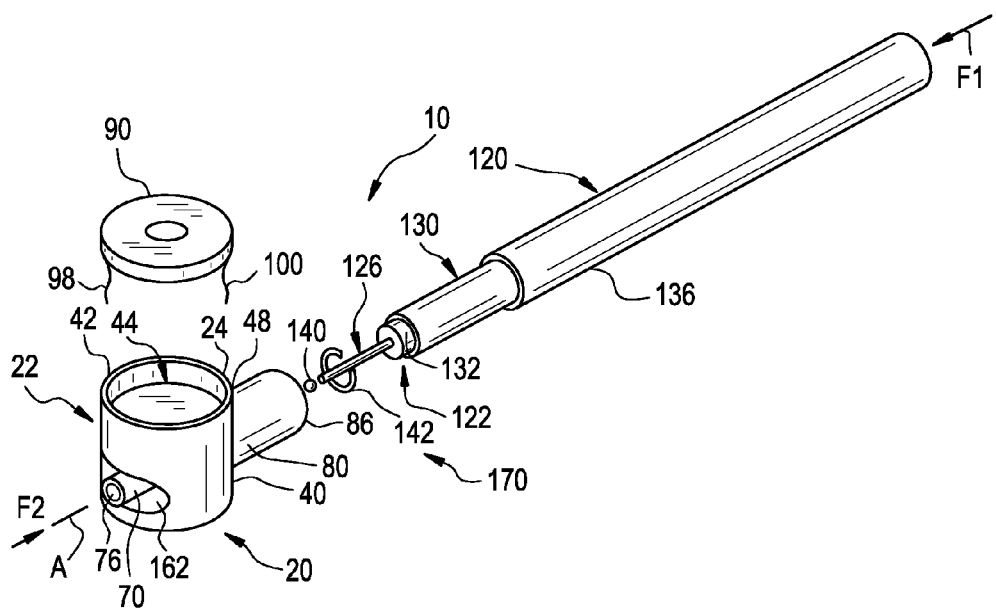
FIG. 2 is a partial exploded perspective view of an offset probe tip having front and rear ferrules extending therefrom for attachment with a coaxial cable in accordance with an exemplary embodiment.
Figure 3:
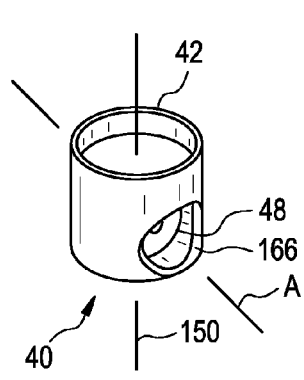
FIG. 3 is a reverse perspective view of the offset probe tip of FIG. 2 without the front and rear ferrules extending therefrom.
Figure 4:
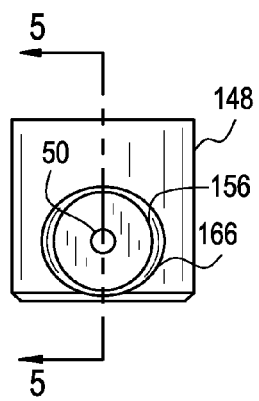
FIG. 4 is an elevation view of the offset probe tip of FIG. 3 illustrating a cavity for disposing the rear ferrule of FIG. 2.
Figure 5:
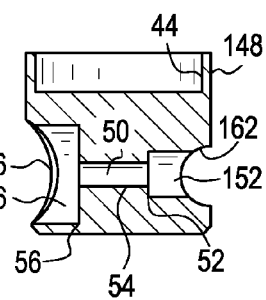
FIG. 5 is a cross-sectional view through section 5—5 of FIG. 4 illustrating cavities for attachment of the front and rear ferrules as well as a sensing element in accordance with an exemplary embodiment.

In essence, and referring to FIG. 2, the encapsulated transducer 10 includes an injection molded encapsulation 20 having a front end 22 and a back end 24. The encapsulation 20 is a monolith of cured moldable material ensconcing a sensing element generally indicated at 90 generally intermediate and above the front and back ends 22, 24, and a portion of an information transmitting medium 120 emanating from the back end 24. A component alignment perform 40 operatively couples the sensing element 90 with the information transmitting medium or cable 120. The component alignment perform 40 includes a front ferrule 70 and a rear ferrule 80 injection molded therewith and linearly spaced apart along an axis "A" of the transducer 10. The component alignment perform 40 further includes a cylindrical or annular recess 44 in which the sensing element or coil 90 is placed so that it is offset or not linearly aligned with respect to the common long axis "A" in which the front and rear ferrules 70, 80 are aligned. In an exemplary embodiment as shown, coil 90 is perpendicularly aligned with respect to axis "A". A first lead 98 of the coil is electrically connected to the front ferrule 70 and a second lead 100 of the coil 90 is electrically connected to the rear ferrule 80. It will be recognized by one skilled in the pertinent art that the coil leads may be attached to opposite ferrules as described above. A back end 48 of the component alignment perform 40 receives a peripheral surface defining ferrule 80. A stripped end 122 of cable 120 is received in ferrule 80 such that a center conductor 126 of the cable 120 mates with the front ferrule 70 and a coaxial conductor 130 mates with the rear ferrule 80. The respective conductors 126, 130 are electrically and mechanically connected to the pair of front and rear ferrules 70, 80.

More specifically, and referring to FIGS. 2–5, the component alignment perform 40 is formed in a first injection molding process where the moldable material includes, but is not limited to, polyphenylene sulfide (PPS). The PPS material is a dielectric and thus an electrical insulating material which has the characteristic of solidifying well over like-material parts. Furthermore, PolyEthylEther Keytone (PEEK) is optionally used, as well as any other electrically insulating material that meets the chemical, environmental and temperature extremes of the application. The front and rear ferrules 70, 80 are preferably placed on a pin support within a mold and the PPS material is molded around the front and rear ferrules 70, 80 thereby forming the component alignment perform 40 as shown in FIG. 2 having an offset sensing element 90 relative to cable 120 extending therefrom. More specifically, this offset includes a 90° angle, but is not limed thereto, depending on the application.

The front and rear ferrules 70, 80 are inner-locked and linearly spaced apart along axis "A" by the PPS material. A top end 42 of the preform 40 includes annular recess 44 thereabove and intermediate the spaced apart front and rear ferrules 70, 80. The preform 40 further comprises a chamber 50 including a bridging section 54 of constant cross-sectional area extending between a front and a rear stepped zone 52, 56 which isolate the front and rear ferrules 70, 80. The front ferrule 70 includes a bore 76 with an inner diameter substantially equal to the outer diameter of the center conductor 126. The rear ferrule 80 includes a bore 86 with an inner diameter substantially equal to the outer diameter of the coaxial conductor 130. In an exemplary embodiment, ferrules 70, 80 are formed from brass, but can be made from other materials such as materials used in solderless connectors or any material that solder will adhere to in a production environment where the proper soldering chemicals are used. Other methods such as crimping, welding or other means of fusing the parts are also possible.

Once the component alignment perform 40 has been formed, the sensing coil 90 may be electrically connected to the respective ferrules 70, 80 of the preform 40. This is accomplished by placing the sensing coil 90 within the annular recess 44 of the preform 40. The first lead 98 is then preferably resistance welded to the front ferrule 70 and the second lead 100 is resistance welded (or it can be soldered, crimped, laser welded) to the rear ferrule 80, thus forming a coil and preform assembly using automated attachment thereof to both ferrules. Alternatively, resistance welding is substituted with soldering, crimping, and laser welding. Next, the cable 120 is electrically and mechanically connected within the preform 40 using an automated solder application and melting process, e.g., fusion process such as resistance welding.

Referring to FIG. 2 again, the cable 120 is a coaxial cable comprised of an outer jacket 136 circumscribing an interior of the cable which includes two concentrically disposed conductors 126 and 130 separated from one another by a concentrically disposed dielectric or insulator 132. More specifically, the outer protective jacket 136 circumscribes the concentrically disposed coaxial and center conductors 130 and 126 which are separated from one another by dielectric 132 interposed between the coaxial and center conductors 130, 126. At least one end 122 of the cable 120 is stripped in a step-like fashion to expose a length of the center conductor 126, the dielectric 132 and the coaxial or outer conductor 130.

An automated solder application and melting process includes solder paste or a solder pellet preform. In an exemplary embodiment, a pellet is used with the front ferrule and solder paste is used with the rear ferrule. Although a ring can be used at the rear, or even a soldering process by hand, a hand soldering process does not lend itself to automation. Using an automatic single pellet dispensing tool, a solder pellet 142 is placed into the component alignment perform. The solder paste 140, applied via an automated and controlled dispensing tool, encircles the coaxial conductor 130 and abuts the outer jacket 136 which is interposed around the coaxial conductor 130. An elastomeric sleeve (not shown) is optionally placed over the dielectric 132 of the cable 120 and includes an inner diameter which substantially matches the outer diameter of the dielectric 132. The elastomeric sleeve may be of an insulating material such as fluorosilicone rubber. The elastomeric sleeve has an outer diameter which is larger than the bridging section 54. Section 54 may be tapered, although not shown, to aid in installation/sealing action of the aforementioned elastomeric sleeve. The cable 120 is then inserted into the back end 48 of the component alignment perform 40 such that the center conductor 126 fits within the bore 76 of the front ferrule 70 and the coaxial conductor 130 fits within the bore 86 of the rear ferrule 80. An axial force exerted as shown by the arrows $F_1$ and $F_2$, deform the elastomeric sleeve against the stepped transition between the bridging section 54 and the rear stepped zone 56. This provides a tight seal between this transition area and the dielectric 132 of the cable 120. A permanent mechanical and electrical connection is made between the coaxial conductor 130 and the bore 86 of the rear ferrule 80 and also between the center conductor 126 and the bore 76 of the front ferrule 70.

The use of inductive heating or carefully controlled and/or automated heating, with the above forces $F_1$, $F_2$ being applied, causes the solder paste 140 and solder pellet 142 to melt and flow over the exposed conductors 126, 130 and upon cooling fixes the exposed conductors 126, 130 permanently throughout their length to the correct position within the bores 76, 86 of the front ferrule 70 and the rear ferrule 80 respectively. Of course, rather than solder, an adhesive or alternate fusion process, e.g., welding, may be used. Note that the preformed amount of solder paste 140 and the preformed solder pellet 142 provide effective repeatability of the electromagnetic characteristics of the entire encapsulated transducer 10, especially with respect to the electrical parameters, e.g., inductance, of the sensing coil 90 which as illustrated is relatively close to the center conductor 126. It should be further noted that an exemplary embodiment utilizes a pellet in the front ferrule and paste around the rear ferrule, that paste may be used in the front ferrule and a ring may be used for the rear ferule connections, as well.

In an exemplary embodiment and still referring to FIGS. 2–5, component alignment perform 40 is a cylindrical molded part having a diameter of about 0.231 inch with first and second cylinders 152 and 156, respectively, configured to retain the metal ferrules 70, 80 protruding from a first cylinder 148 defining annular recess 44 defined by preform 40. The axis "A" of the cylinders 152, 156 containing the ferrules is perpendicular to an axis 150 of the first cylinder 148. As described above, perform 40 is a composite, injection molded plastic material around metal ferrules 70 and 80. However, it is contemplated that perform 40 can also be molded as cylinder 148 or a cylinder of a diameter larger than a finished preform and then machined to include annular recess 44 and opposing cavities perpendicular to recess 44 for respective ferrules 70 and 80.

In an exemplary embodiment as depicted in FIGS. 2–5, preform 40 is molded with cylinder 152 configured to receive front ferrule 70 and cylinder 156 configured to receive rear ferrule 80. Cylinders 152, 156 coincide with stepped zones 52 and 56, respectively. First cylinder 148 is further defined with notches 162, 166 corresponding to first and second cylinders 152, 156, respectively. Notches 162 and 166 extend from an exterior surface defining first cylinder 148 to allow access to each respective ferrule 70, 80 for resistance welding cable 120 therewith. It will be recognized by one skilled in the art that although notches 162, 166 have been described as being cylindrical or round, notches 162, 166 may be of any open shape.

More specifically, the notches 162 and 166 allow access to corresponding front and rear metal ferrules 70 and 80, respectively, to allow for automated attachment between the sensing element wires and the extension cable center conductor and outer shield. The automated attachment is enabled by the fact that the metal ferrules allow a resistance weld or automated solder/fusion process at the sensing element leads and an automated solder application and melting process at the extension cable connection.

One advantage of the above described exemplary embodiment is that it may be automated during the assembly processes of welding and soldering or fusing. This advantage reduces manual labor and potential human errors, thus increasing part to part consistency. Other advantages are related to the fact that the preform is injection molded rather than manually machined by hand. Injection molding increases dimensional control of the preform and reduces the likelihood of manufacturing errors.

Once the coil and cable assembly 170 (FIG. 2) is formed with the composite molded part, it is ready to be encapsulated.

Figure 6:
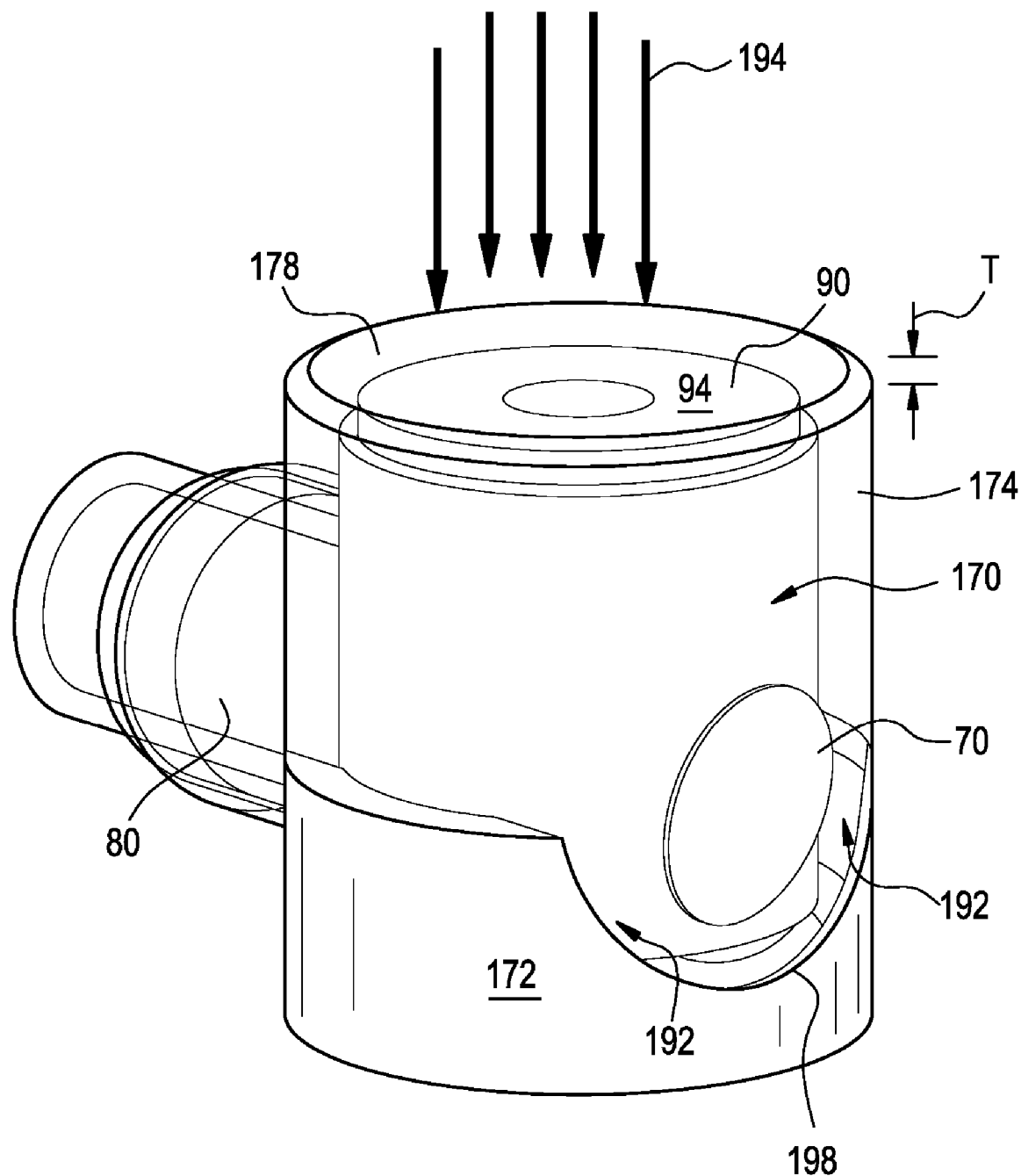
FIG. 6 is a perspective view of the assembly of FIG. 2 encapsulated within a metallic interface component illustrating injection flow to encapsulate the same in accordance with an exemplary embodiment.

Referring now to FIG. 6, coil and cable assembly 170 is fixedly secured to a metal interface cup 172 for disposal with a machine. The coil and cable assembly 170 is encapsulated by a secondary injection molding process which provides a durable encapsulation 174 which bonds with itself and with the coil and cable assembly 170. The coil and cable assembly 170 are perpendicularly disposed within the encapsulation 174 and the encapsulation 174 includes an integrally formed protective wall 176 having an uniform thickness "T" along a topmost portion of the sensing element 90.

A front face 94 of the coil 90 is precisely spaced from a top wall of a mold cavity that defines a top wall 178 of encapsulation 174 during molding. This allows the encapsulation 174 of the encapsulated transducers 10 to include the integrally formed protective wall 26 having a substantially uniform thickness "T" and thus, a predetermined linear range (see also FIG. 8). This is particularly important when manufacturing a plurality of encapsulated transducers 10 which are to have uniform electrical characteristics.

Figure 7:
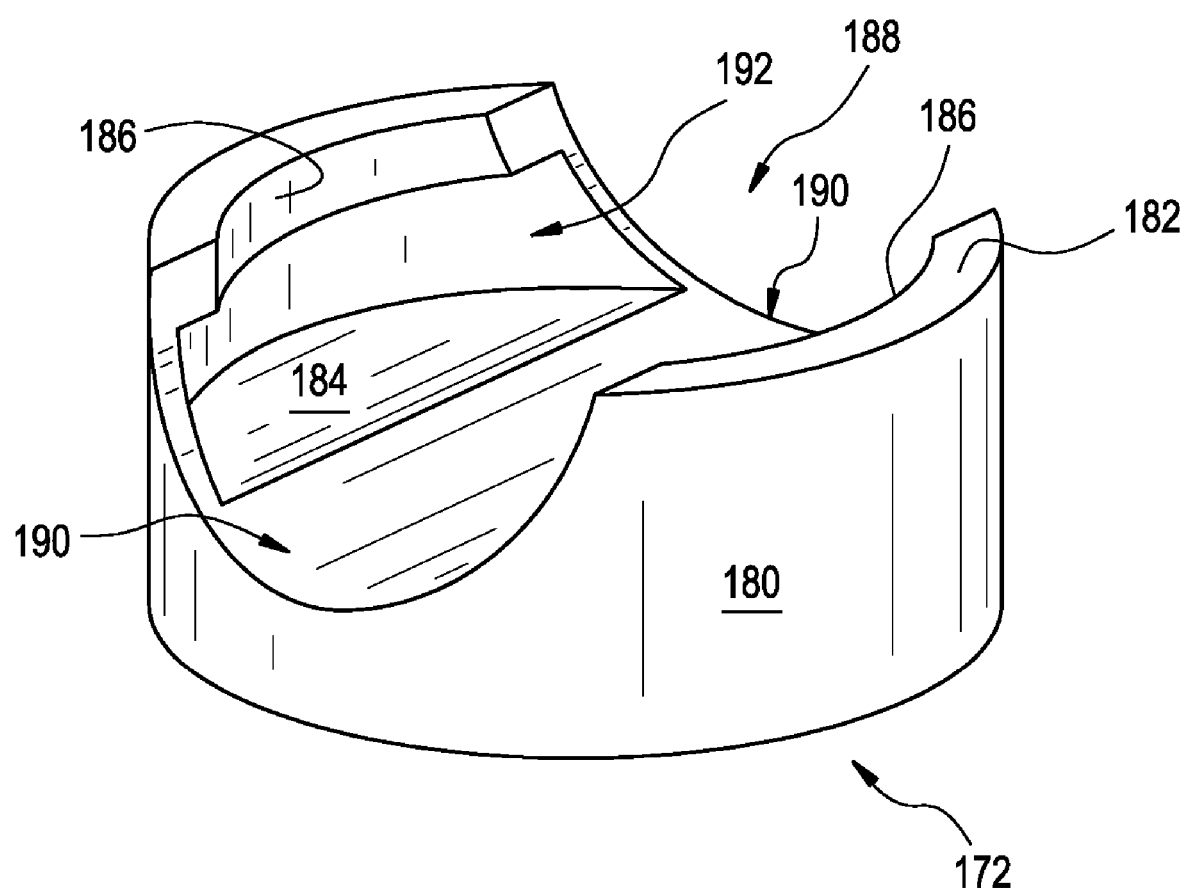
FIG. 7 is a perspective view of the metallic interface component of FIG. 6 configured to encapsulate the assembly of FIG. 2 for operable connection with the machine of FIG. 1 in accordance with an exemplary embodiment.

Referring now to FIG. 7, metal interface cup 172 will be described in more detail. In an exemplary embodiment, metal interface cup is a steel or stainless steel cup substantially configured as a cylinder 180 defined by a cylinder wall 182 and a bottom wall 184 closing a bottom of cylinder 180. Cylinder 180 includes a bore 186 corresponding to an inner diameter defined by cylinder wall 182. Bore 186 corresponds to an outside diameter of coil and cable assembly 170. Cylinder 180 further includes a bore 188 extending through opposing sides defining cylinder wall 182 and substantially transverse to bore 186. Bore 188 creates a channel 190 in wall 184 which is substantially flat. However, it is also contemplated that the at least one void or channel 190 is optionally formed apart from forming bore 188. Furthermore, an undercut 192 is configured in cylinder wall 182 on opposing sides of bore 188 extending through cylinder 180 transverse to bore 186 configured to receive assembly 170 therein. Undercuts 192 define a partial groove configured in an interior wall defining cylinder wall 182 that remains when bore 188 is configured therethrough as best seen in FIGS. 6 and 8.

It will be recognized by one skilled in the pertinent art that bore 188 defines generally a U-shaped cavity extending therethrough as opposed to a cylindrical cavity. Furthermore, bore 188 extending through cylinder 180 is aligned with front and rear ferrules 70, 80 extending through first cylinder 148 defining perform 40.

Figure 8:
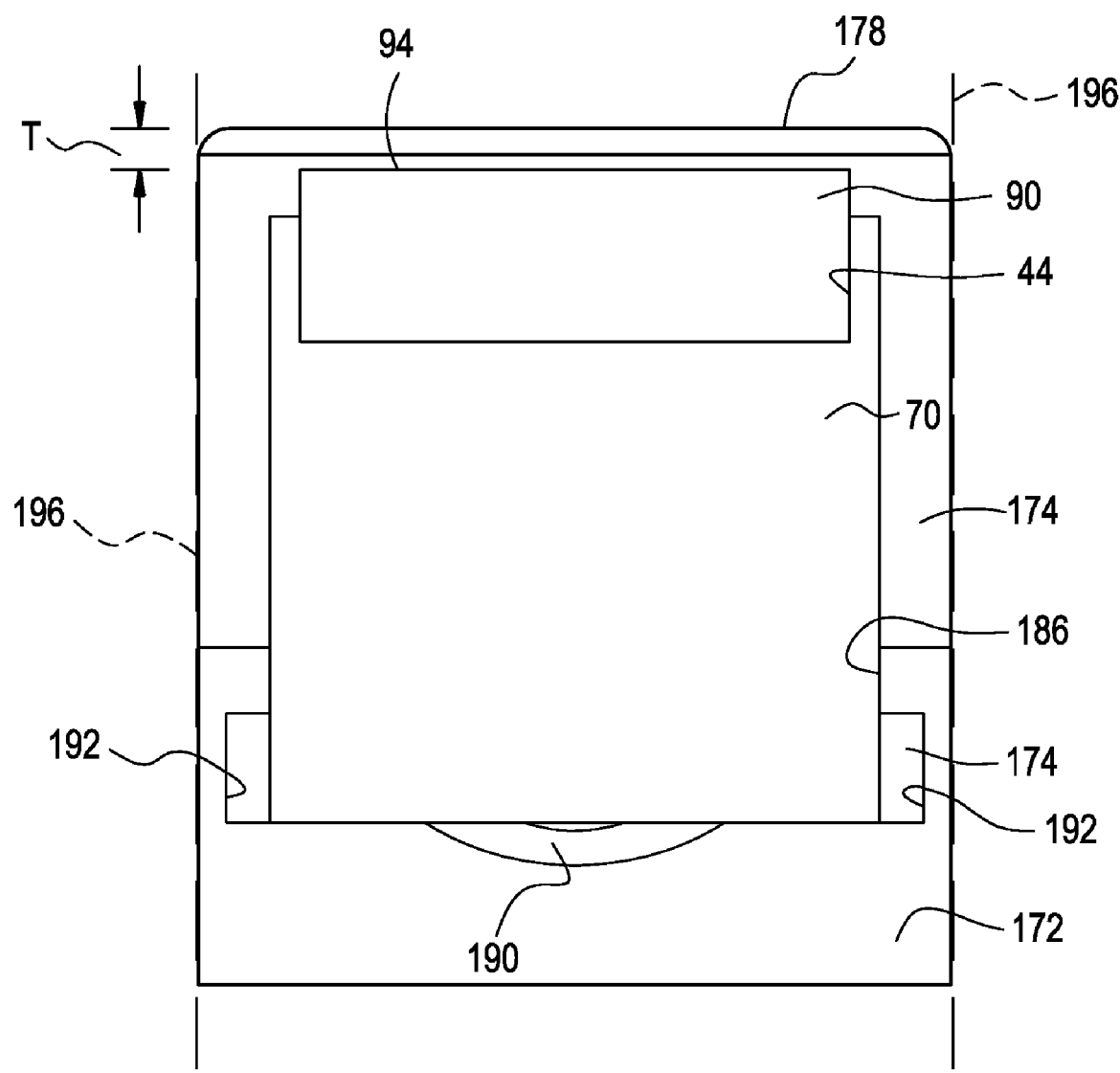
FIG. 8 is a cross section view of the assembly of FIG. 2 encapsulated within the metallic interface component of FIG. 7.

Referring now to FIGS. 6–8, when coil and cable assembly 170 is disposed within bore 186 of cylinder 180 and ferrules 70 and 80 are aligned with bore 188, only a peripheral portion of a bottom surface of sensor and cable assembly 170 contacts bottom wall 184 and only a remaining bore 186 contacts cylindrical portion defining an exterior surface of assembly 170 as best seen with reference to FIG. 8.

It will also be recognized that bore 188 of the cylindrical metal component 172 is further machined to have a groove or undercut 192 on an inner diameter defining cylinder wall 184. The undercut groove should be of sufficient depth and width relative to the size of the components and assembly to provide desired strength in an axial direction. In an exemplary embodiment, groove 192 extends into cylinder wall 184 about 0.015 inch, while having a width of about 0.035 to about 0.040 inch. However, other dimensions are contemplated suitable for the desired end purpose.

If torsional strength is also required, channel 190 and/or at least one void should be provided along an inner surface defining bottom wall 184 of the metal component 172 so that plastic may fill channel 190 and then continue to flow to undercuts 192 on either side, then, upon solidification, form a strong torsional interference member. Channel 190 may be of any shape other than having a rounded shape as shown.

More specifically with reference to FIGS. 6–8, coil and cable assembly 170 is "overmolded" via a secondary injection of plastic in a flow direction depicted generally at 194. As best seen with reference to FIG. 8, injection flow of plastic indicated at 194 would not be able to flow to undercuts 192 unless the fit between bore 186 and coil and cable assembly 170 is looser. It will be noted that a mold indicated with phantom lines 196 in FIG. 8 defines the overmold or further encapsulation of assembly 170 with interface cup 172. As best seen with reference to FIG. 6, plastic flows down an axial length defining the overmold and then into the undercuts 192 and channel 190 via a U-shaped cutout 198 on opposing sides of cup 172 defined by bore 188. The flow of plastic flows circumferentially into the undercuts 192 from the axial flow of plastic into opposing U-shaped cutouts 198. The above described assembly has demonstrated significant resilience under highly accelerated life testing using temperature cycling and vibration in excess of 50 G. It should be noted that plastic can also flow into and around the part in any direction sufficient to fully encapsulate the part; it does not have to flow down and around the part as shown. Perhaps increased mold pressures would allow a side or rear gate for the flow of plastic around the part being encapsulated.

Upon completion of the overmolding of the assembly 170 of the tip for an eddy current transducer, the transducer components are embedded in plastic and are axially and torsionally secured with respect to the metal component 172 that provides an interface between the transducer components and a metal transducer case.

Figure 9:
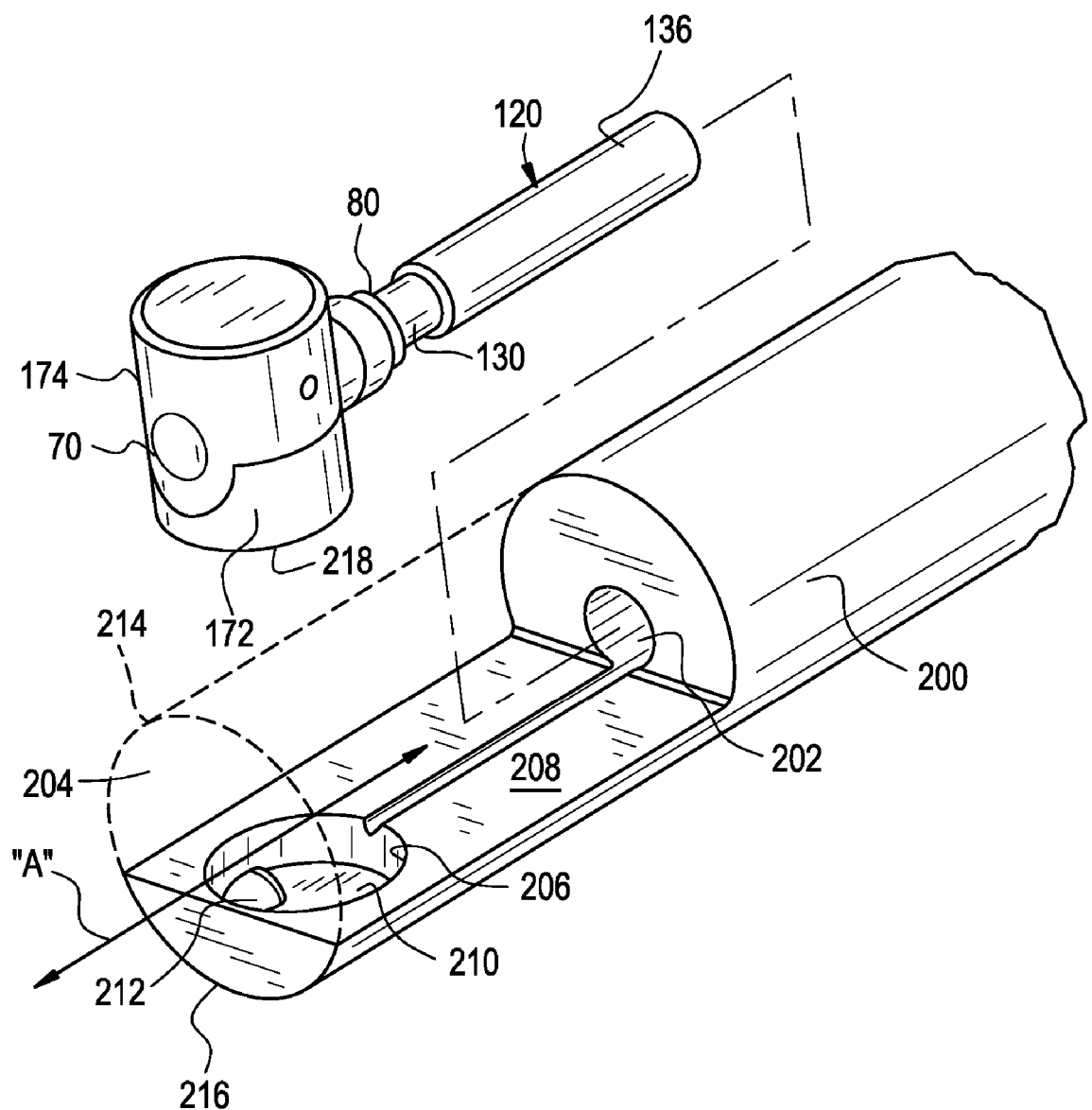
FIG. 9 is a top perspective view of the assembly of FIG. 8 positioned above a cylindrical probe case for fused attachment therewith in accordance with an exemplary embodiment.
Figure 10:
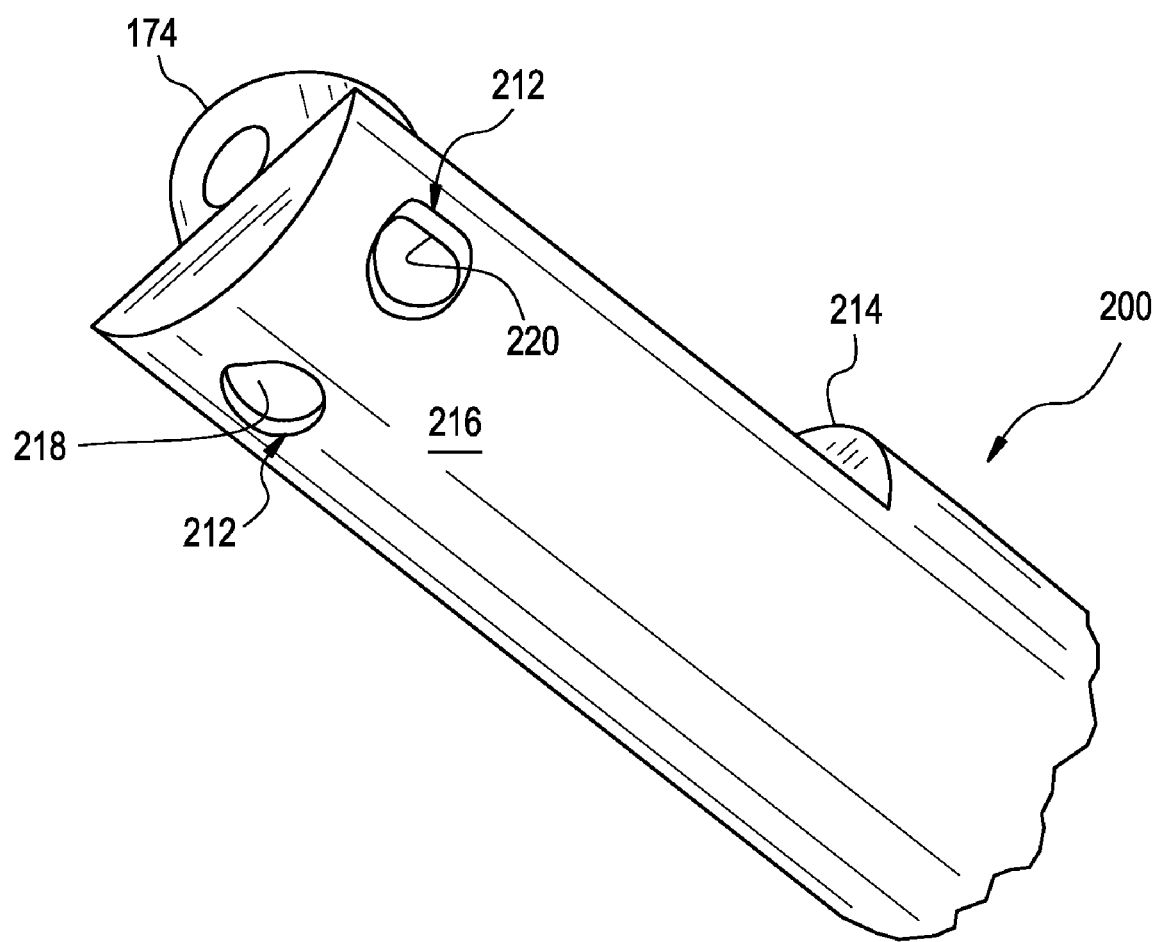
FIG. 10 is a bottom perspective view of the assembly of FIG. 9 illustrating a fusion process with or without the addition of material applied at an interface between mating surfaces defining the metallic interface component and attachment access holes configured in the cylindrical probe case in accordance with an exemplary embodiment.

Referring now to FIGS. 9 and 10, a cylindrical metal transducer case 200 is illustrated with assembly 170 and metal interface cup removed therefrom in FIG. 9 and welded thereto in FIG. 10.

In an exemplary embodiment, metal transducer case 200 is a stainless steel cylindrical member having a bore 202 configured to receive extension cable 120 therethrough. A section generally indicated in phantom at 204 is removed from one end of case 200. A first bore 206 is configured in a flat portion 208 to receive metal interface cup 172 defined by cylinder 180 while leaving a tip of the proximity probe exposed. Bore 206 is further defined by a bottom surface 210 closing one end of bore 206.

The metal probe case 200 is further configured with a second bore 212 (two shown) extending from a substantially opposite side of a surface 214 defining a cylindrical portion of section 204. The second bore 212 extends substantially perpendicular from a surface 216 defining an opposite side of surface 214. It will be noted that only a portion of each second bore 212 intersects the bottom surface 210 defining closed end of bore 206 creating a through hole into the first bore 206.

When the metal interface cup 172 is disposed in first bore 206, the through holes defined by a portion of each bore 212 extending into bore 206 create a "fusion" or "weld" hole that is covered by a bottom surface 218 defining cup 172. After each through hole is covered by surface 218, an interface between two exposed mating surfaces defining the cup 172 and each second bore 212 is welded, thus securing cup 172 with case 200. In an exemplary embodiment a laser weld is used since the electronic components are installed in the proximity probe which is secured in metal interface cup 172, however, other welding or fusion methods with or without the addition of filler or binding material are contemplated suitable for the desired end purpose.

For example, fusion processes include, but are not limited to, brazing whereby the internal electronics of the part is not susceptible to a temperature greater than the maximum operating temperature of the internal electronics. The fusion process also includes gluing or other metal to metal adhesion with the addition of a third material. A temperature based shrink fit of the case around the tip is also contemplated. Press fit engagement therebetween, or even using a mechanical fastener is contemplated for attachment of a metal interface cup to a metal case, whereby a ring is configured with threaded holes not protruding through the metal interface cup (e.g., terminating before penetrating therethrough). Even a set screw installed and tightened tangential to a diameter of the interface cup is contemplated for certain machines.

It will also be recognized by one skilled in the pertinent art that the fusion process also optionally includes a "staking" process, where a feature extending from the metal case is "mushroomed" or folded over a portion of the tip assembly, thus securing each to another. For example, the assignee of the present application utilizes a staking process on probes to retain rear probe case washers, and uses a roll crimp of the tip into the case on other probes. It is also contemplated that the interface cup may be configured larger in diameter than the encapsulated tip section, such that a second ring is disposed over the encapsulated tip section and then press fit or welded over-top of the tip and wide diameter interface cup.

If a plastic interface between the case and tip assembly is used, it is contemplated that the case and tip assembly are configured with complementary snap-fit engagement features that allow snap-fit engagement. locking the tip with the case.

In an exemplary embodiment, two second bores 212 are utilized, however, one skilled in the pertinent art will readily recognize that one bore 212 aligned or not aligned with bore 206 may be employed. Further, when two second bores 212 are used, each second bore 212 is smaller in diameter than first bore 206. In an exemplary embodiment as illustrated, each second bore 212 is less than half a diameter of first bore 206. It will also be pointed out that a centerline of each second bore 212 intersects a centerline defining the axis of cylindrical metal probe case 200 corresponding with axis "A" in FIG. 9.

Figure 11:
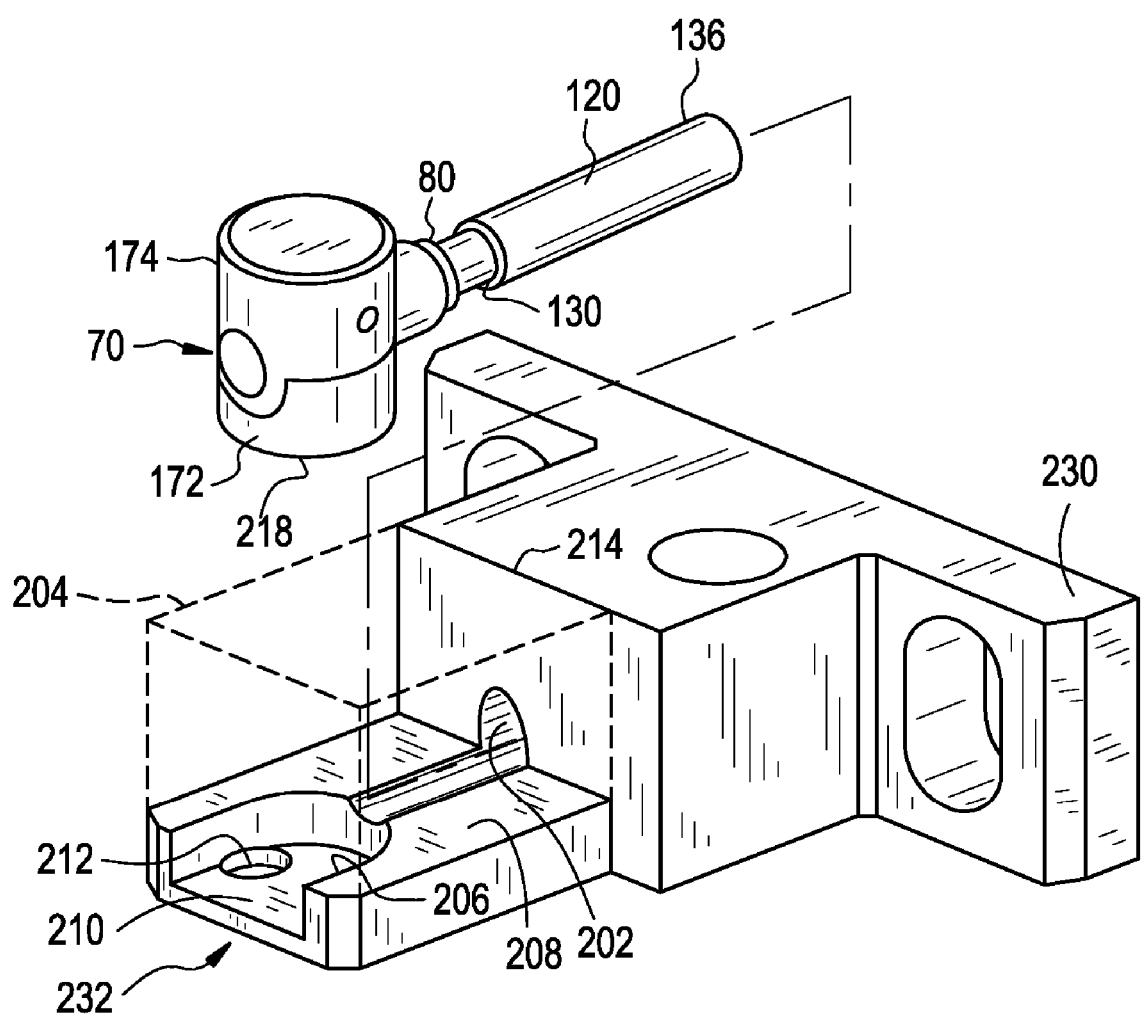
FIG. 11 is a top perspective view of the assembly of FIG. 8 positioned above a rectangular probe case for fused attachment therewith in accordance with an alternative exemplary embodiment.
Figure 12:
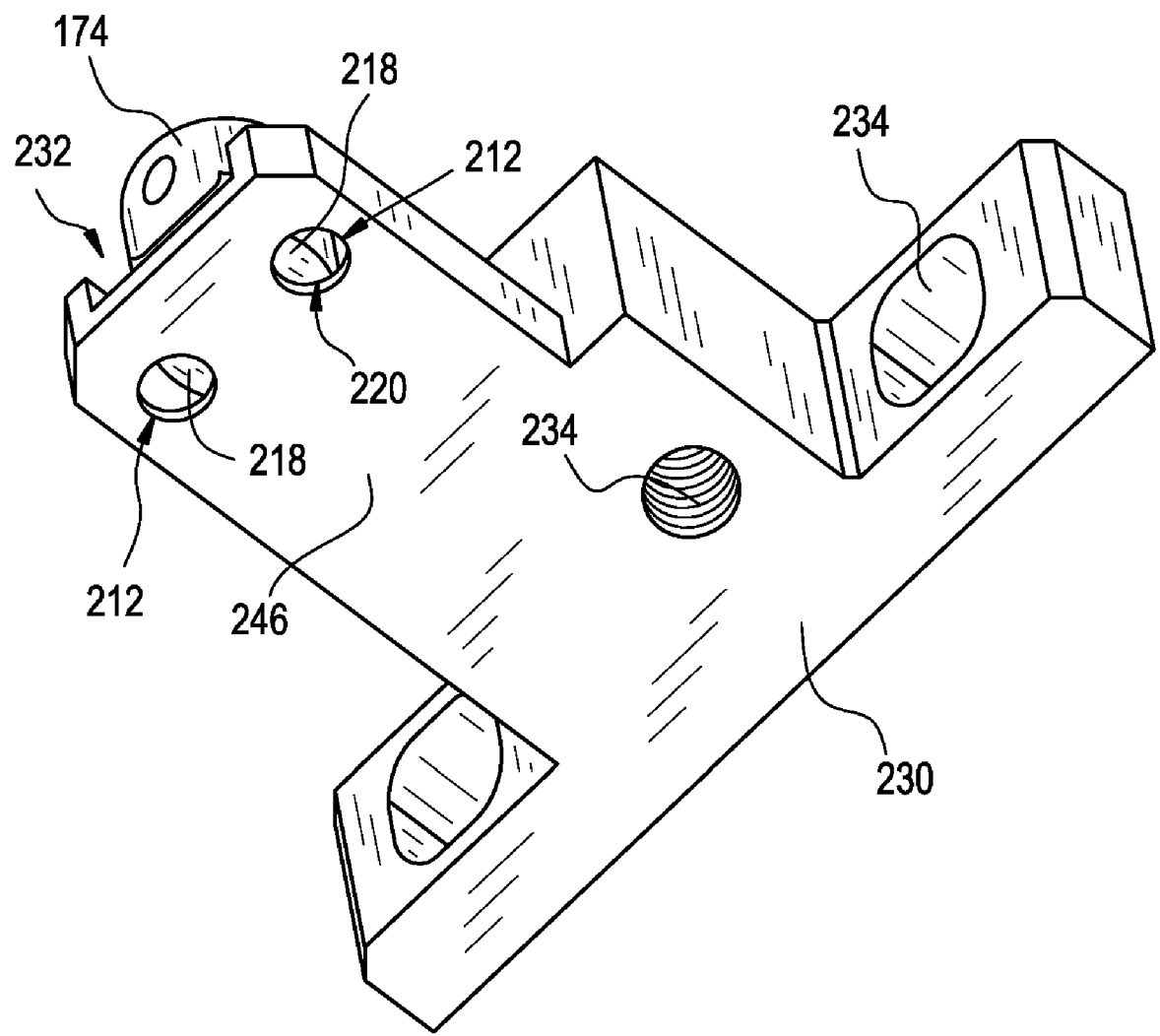
FIG. 12 is a bottom perspective view of the assembly of FIG. 11 illustrating a fusion process with or without the addition of material, applied at an interface between mating surfaces defining the metallic interface component and attachment access holes configured in the rectangular probe case in accordance with an alternative exemplary embodiment.

Referring now to FIGS. 11 and 12, an exemplary alternative embodiment of a metal transducer case is illustrated. More specifically, FIGS. 11 and 12 illustrate a rectangular meal transducer case 230.

In an exemplary alternative embodiment, metal transducer case 230 is a stainless steel rectangular member having a bore 202 configured to receive extension cable 120 therethrough. A section generally indicated in phantom at 204 is removed from one end of case 230. A first bore 206 is configured in a flat portion 208 to receive metal interface cup 172 defined by cylinder 180 while leaving a tip of the proximity probe exposed. Bore 206 is further defined by a bottom surface 210 closing one end of bore 206.

The metal probe case 230 is further configured with a second bore 212 (two shown) extending from a substantially opposite side of a surface 214 defining a cylindrical portion of section 204. The second bore 212 extends substantially perpendicular from a surface 216 defining an opposite side of a surface 214. It will be noted that only a portion of each second bore 212 intersects the bottom surface 210 defining closed end of bore 206 creating a through hole into the first bore 206.

When the metal interface cup 172 is disposed in first bore 206, the through holes defined by a portion of each bore 212 extending into bore 206 create a "weld" or fusion hole that is covered by a bottom surface 218 defining cup 172. After each through hole is covered, an interface 220 between two exposed mating surfaces defining the cup 172 and each second bore 212 is welded, thus securing cup 172 and thus encapsulated probe 174 with case 230. In an exemplary alternative embodiment a laser weld is used since the electronic components are installed in the proximity probe which is secured in metal interface cup 172 however, other welding or fusion methods with or without the addition of filler or binding material are contemplated suitable for the desired end purpose.

In an exemplary alternative embodiment, two second bores 212 are utilized, however, one skilled in the pertinent art will readily recognize that one bore 212 aligned or not aligned with bore 206 may be employed. Further, when two second bores 212 are used, each second bore 212 is smaller in diameter than first bore 206. In an exemplary alternative embodiment as illustrated, each second bore 212 is less than half a diameter of first bore 206. Furthermore, it will be recognized that a portion 232 of bore 206 in rectangular metal transducer case 230 is open to allow cup 172 having cable 120 extending therefrom to facilitate entry of cable 120 and cup 172 in bores 202 and 206, respectively.

Still referring to FIGS. 11 and 12, case 230 is configured in a "T" shape with mounting apertures 234 configured therein for mounting to a machine, however, other geometries are contemplated suitable for the desired end purpose. However, it is contemplated that other geometries may be offered to customers on a case-by-case basis, including features to facilitate mounting in a variety of machines.

Figure 13:
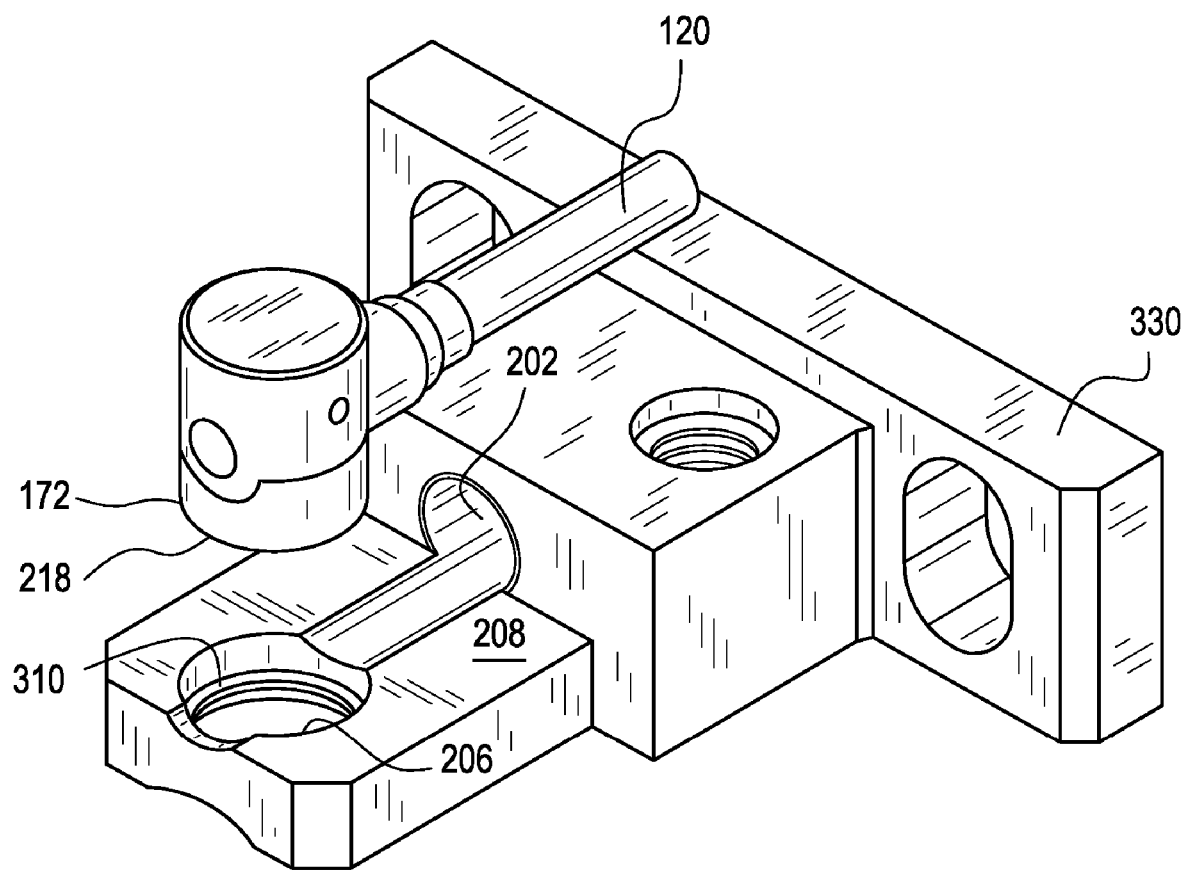
FIG. 13 is a top perspective view of the assembly of FIG. 8 positioned above rectangular probe case for fused attachment therewith in accordance with another alternative exemplary embodiment.
Figure 14:
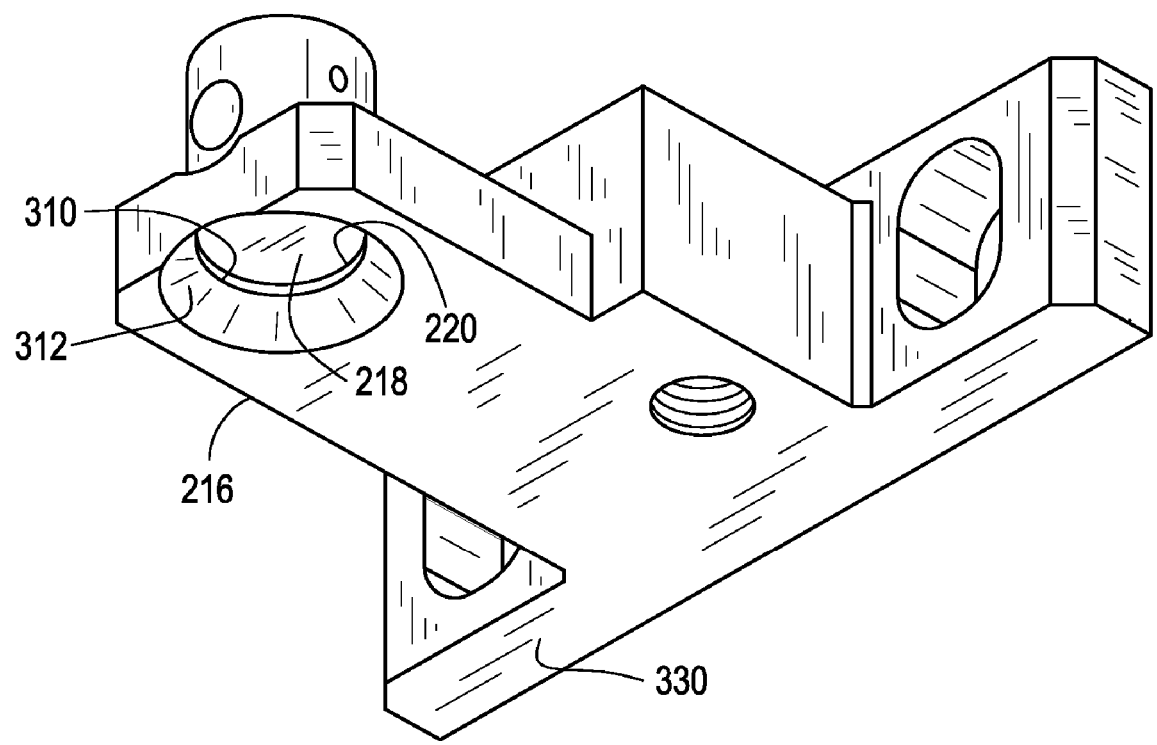
FIG. 14 is a bottom perspective view of the assembly of FIG. 13 illustrating a fusion process with or without the addition of material, applied at an interface between mating surfaces defining the metallic interface component and attachment access holes configured in the rectangular probe case in accordance with another alternative exemplary embodiment.

Referring now to FIGS. 13 and 14, another exemplary alternative embodiment of a metal transducer case is illustrated. More specifically, FIGS. 13 and 14 illustrate a rectangular metal transducer case 330.

In an exemplary alternative embodiment, metal transducer case 330 is a stainless steel rectangular member having a bore 202 configured to receive extension cable 120 therethrough. A first bore 206 is configured in a flat portion 208 to receive metal interface cup 172 defined by cylinder 180 while leaving a tip of the proximity probe exposed.

The metal probe case 330 is further configured with a second bore or counterbore 312 aligned with first bore 206 extending from a substantially opposite side of a surface 214 defining a cylindrical portion of section 204. The second bore 312 extends substantially perpendicular from a surface 216 defining an opposite side of a surface 214. In an exemplary embodiment, second bore 312 defines a frustocone or truncated cone as illustrated in FIG. 14. First and second bores interface at an annular ring 310 defining a bore smaller than first and second bores 206, 312. It will be noted that the annular ring 310 creates a through hole into the first and second bores 206, 312.

When the metal interface cup 172 is disposed in first bore 206, the through hole defined by annular ring 310 defining an interface between first and second bores 206, 312 creates a "weld" or fusion hole that is covered by a bottom surface 218 defining cup 172. After each through hole is covered, an interface 220 between two exposed mating surfaces defining the cup 172 and second bore 312 is welded, thus securing cup 172 and thus encapsulated probe 174 with case 330. In an exemplary alternative embodiment a laser weld is used since the electronic components are installed in the proximity probe which is secured in metal interface cup 172 however, other welding or fusion methods with or without the addition of filler or binding material are contemplated suitable for the desired end purpose. It will be recognized by one skilled in the art that the fustoconical shape of second bore 312 facilitates access for fusion at interface 220. The above described offset tip design places the probe tip perpendicular to its extension cable, allowing for the probe to be mounted in extremely tight locations such as in-between critical machine components and the target surface being measured. An exemplary embodiment of the invention not only enables a very short proximity probe, but also enables the use of automated processes for its manufacture. Previous designs for limited space mounting probes have utilized labor intensive, hand-machined and/or hand assembled components along with hand mixed and applied epoxy filler/adhesive to create probes to fit in similarly tight locations.

The above described exemplary embodiments allow automated fusing and soldering during assembly thereof. This in turn reduces manual labor and potential human errors, increasing part to part consistency. Another aspect allows for an injection molded part rather than manually machined by hand which also increases dimensional control of the part and reduces the likelihood of manufacturing errors.

In use and operation, and referring to FIGS. 1 and 2, the encapsulated transducer 10 may, for example, be utilized as a proximity transducer for monitoring the vibrational characteristics of a rotating shaft 282 of a machine 280. In this environment the encapsulated transducer 10 operates on the eddy current principle and outputs a signal correlative to the spacing between the rotating shaft 282 and the sensing coil 90 of the encapsulated transducer 10.

Typically, the encapsulated transducer 10 is circumscribed by a threaded metal case 284 which is mounted adjacent the rotating shaft of the machine 280. However, as described above, case 200 and 230 may be employed when space limitations in large machines require very small (short from front to back, or from face of probe tip to rearmost portion of tip) probes. A mounting means 286 is used to strategically mount the encapsulated transducer 10 such that the sensing coil 90, proximate the front end 22 of the encapsulation 20, and the rotating shaft 282 are in a juxtaposed relation. The sensing coil 90 is electrically and mechanically connected to the cable 120, however, not linearly aligned therewith. The cable 120 extends out the back end 24 of the encapsulation 20 and runs through a casing 288 of the machine 280 where it preferably terminates to a connection 290 capable of directly coupling to an electrical processing unit 311 or to an extension cable, which in turn couples to the electrically processing unit 311.

The cable 120 may be routed through the machine case 288 by passing through a rubber grommet 294 internal to an adaptor 292 operatively coupled to the machine case 288. The adaptor 292 includes a first end 296 having external and internal threads. The external threads of the adaptor are coupled with a threaded bore 300 in the machine case 288 for firmly connecting the adaptor 292 thereto. In some instances, the internal threads of the first end 296 of the adaptor 292 allow the mounting of the encapsulated transducer 10 via the threaded metal case 284. A second end 298 of the adaptor 292 having external threads may be coupled to a threaded aperture 304 in a junction box 302 such that the junction box 302 is mounted to the machine case 288. The junction box 302 allows any electrical connections operatively coupling the cable 120 to the electrical processing unit 310 to be enclosed in a weather-proof or explosion-proof environment. Although the above described method is specific to one method of applying proximity probes, other methods are contemplated suitable to the desired end purpose.

In addition to use as a proximity transducer, an exemplary embodiment of the present invention may be employed very broadly in the monitoring and diagnostic field. One example is as a temperature transducer which would use a coil formed from a single wire thermocouple of the RTD type. The coil would be molded within the encapsulation 20 and the only change in the above delineated process may be in the use of perhaps a thinner overall encapsulation. This would provide for a suitable heat transfer to the RTD temperature sensing coil.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A proximity probe apparatus offset to an axis defining an extension cable comprising:
    a sensing element;
    a cylindrical part molded with a moldable material;
    a recess configured in one of two opposing ends defining said cylindrical part to receive said sensing element;
    a first and a second ferrule each extending from opposing surfaces defining an exterior of said cylindrical part, a first axis defining said first and second ferrules being offset from a second axis defining said cylindrical part; and
    an extension cable operably attached to said sensing element via said first and second ferrules, said sensing element being disposed offset relative to said extension cable.

2. The apparatus of claim 1 wherein said first and second ferrules are linearly spaced apart along said first axis.

3. The apparatus of claim 2 wherein said first and second ferrules are placed on a pin support within a mold, said moldable material is one of injection molded and transfer molded around said first and second ferrules thereby forming a component alignment perform.

4. The apparatus of claim 3 wherein said component alignment perform is molded as a cylinder, said cylinder being machined to include an annular recess and opposing cavities substantially perpendicular to said recess for respective said first and second ferrules.

5. The apparatus of claim 3 wherein said component alignment perform is formed in a first injection molding process where said moldable material includes one of PolyPhenylene Sulfide (PPS) and PolyEthylEther Keytone (PEEK).

6. The apparatus of claim 4 wherein said moldable material includes a material capable of rigorous chemical and temperature extremes.

7. The apparatus of claim 1 wherein said offset includes a 90° angle.

8. The apparatus of claim 1 wherein said cylindrical molded part is molded having a diameter of about 0.231 inch.

9. The apparatus of 1 wherein said sensing element is disposed within said recess, a first lead of said sensing element is resistance welded to said first ferrule, a second lead of said sensing element is resistance welded to said second ferrule, a center conductor of the extension cable is inserted into said first ferrule from said second ferrule, a coaxial conductor of the extension cable is inserted into said second ferrule, and the extension cable is electrically and mechanically connected with respective ferrules using an automated solder application and melting process.

10. The apparatus of claim 9 wherein an inductive heating is used to cause at least one of a solder pellet, solder paste, and a solder ring to melt and flow over exposed conductors of the extension cable, and said exposed conductors are allowed to cool to electrically and mechanically secure bores defining each of said first and second ferrules with a respective said exposed conductors.

11. The apparatus of claim 9 wherein respective bores are configured transverse to first and second cylinders defining corresponding apertures for each of said first and second ferrules, said bores generally extending tangential to an exterior circumferential surface defining said cylindrical part to allow access to each respective said first and second ferrules for said resistance welding the first and second leads with a corresponding ferrule of said first and second ferrules.

12. The apparatus of claim 1 wherein said first and second ferrules are formed from brass.

13. The apparatus of claim 1 wherein said moldable material includes an electrical insulating material which has a characteristic of bonding to itself.

* * * * *